(12) United States Patent
Liu

(10) Patent No.: US 10,754,464 B2
(45) Date of Patent: Aug. 25, 2020

(54) DISPLAY DEVICE

(71) Applicant: HON HAI PRECISION INDUSTRY CO., LTD., New Taipei (TW)

(72) Inventor: Feng-Hsiang Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/405,298

(22) Filed: May 7, 2019

(65) Prior Publication Data
US 2019/0377448 A1   Dec. 12, 2019

(30) Foreign Application Priority Data
Jun. 8, 2018   (CN) .......................... 2018 1 0589464

(51) Int. Cl.
*G06F 3/041* (2006.01)
*G06F 3/044* (2006.01)
*G09G 3/36* (2006.01)

(52) U.S. Cl.
CPC ............ *G06F 3/0412* (2013.01); *G06F 3/044* (2013.01); *G06F 3/0416* (2013.01); *G09G 3/3655* (2013.01); *G09G 2320/0233* (2013.01)

(58) Field of Classification Search
CPC .. G06F 3/0412; G06F 3/0416; G06F 3/04166; G06F 3/044; G06F 3/0445; G06F 3/0448; G09G 3/3655; G09G 2320/0233
See application file for complete search history.

(56) References Cited

U.S. PATENT DOCUMENTS

| | | |
|---|---|---|
| 2014/0160377 A1 | 6/2014 | Yamagishi et al. |
| 2014/0267955 A1 | 9/2014 | Hibayashi et al. |
| 2015/0009171 A1* | 1/2015 | Shepelev .............. G06F 3/0416 345/174 |
| 2015/0091840 A1* | 4/2015 | Shepelev .............. G06F 3/0416 345/174 |
| 2015/0185940 A1* | 7/2015 | Han ........................ G06F 3/044 345/174 |
| 2016/0291782 A1* | 10/2016 | Zhai ........................ G06F 3/044 |
| 2016/0320894 A1* | 11/2016 | Lu ............................ G06F 3/041 |
| 2017/0168620 A1* | 6/2017 | Gim ..................... G09G 3/3696 |
| 2017/0192608 A1* | 7/2017 | Jang ..................... G06F 1/3262 |

FOREIGN PATENT DOCUMENTS

| | | |
|---|---|---|
| TW | I467455 B | 1/2015 |
| TW | I504987 B | 10/2015 |

* cited by examiner

*Primary Examiner* — Stacy Khoo
(74) *Attorney, Agent, or Firm* — ScienBiziP, P.C.

(57) ABSTRACT

A display device able to provide uniform display brightness comprises a first substrate and spaced common electrodes which on the first substrate. The common electrodes are used for display and include at least one first sub-electrode and a plurality of second sub-electrodes, an area of each first sub-electrode being smaller than an area of any one of the second sub-electrodes. When the device is in display, a first common electrode voltage is applied to the first sub-electrodes, and a second common electrode voltage is applied to the second sub-electrode, the voltage value of each being different.

19 Claims, 3 Drawing Sheets

DISPLAY DEVICE

FIELD

The subject matter herein generally relates to display devices, and particularly relates to touch display devices.

BACKGROUND

Touch display devices are popular. Such display devices include in-cell touch display devices which integrate touch sensors into display panels. To reduce the thickness of an in-cell touch display device, common electrodes of the in-cell touch display device are used as touch driving electrodes or as touch sensing electrodes. In some designs, openings or holes may form in the touch display panel, and such openings or holes may change an area of the common electrodes around the openings or holes, resulting in inconsistent load on the common electrodes. Therefore, the brightness of the display device is uneven, which affects the display quality.

Therefore, there is room for improvement in the art.

BRIEF DESCRIPTION OF THE DRAWINGS

Implementations of the present technology will now be described, by way of embodiments, with reference to the attached figures.

DETAILED DESCRIPTION

Figure 1:
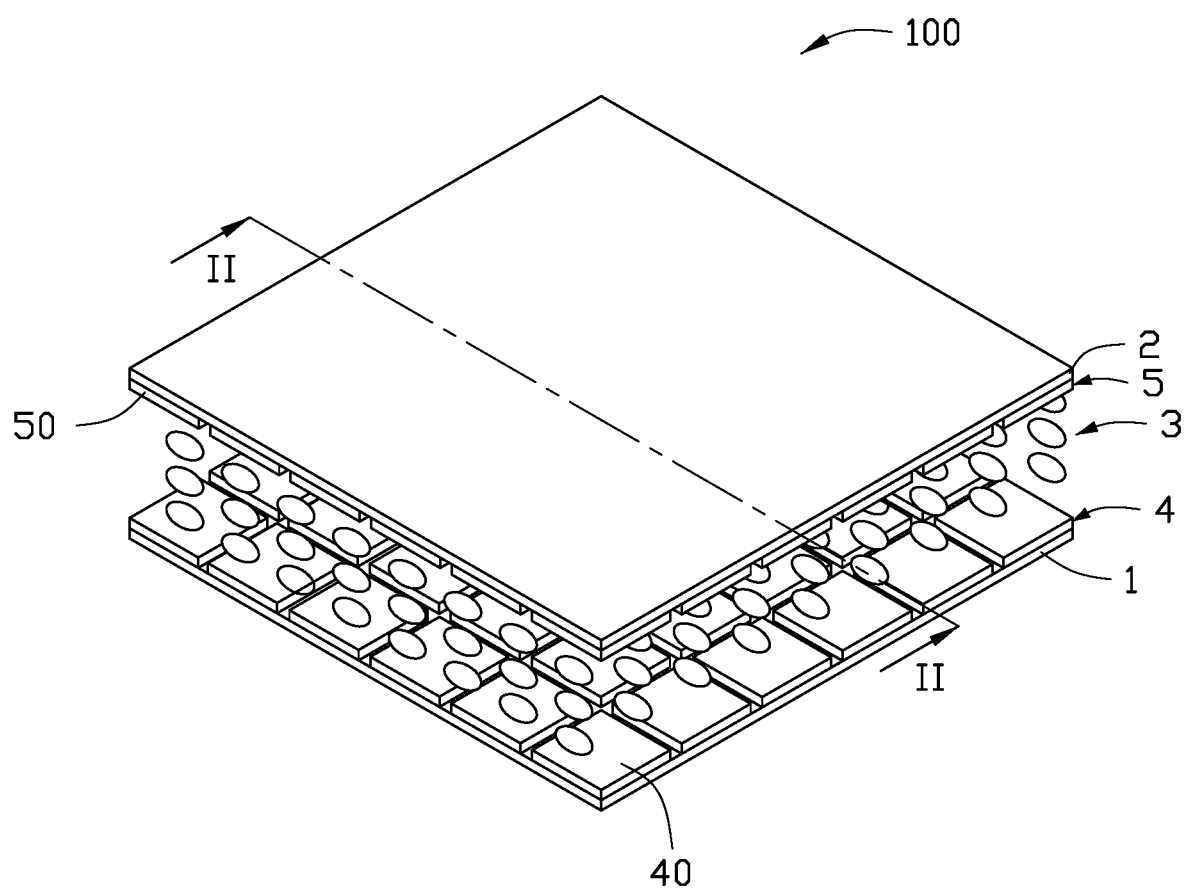
FIG. 1 is a perspective view of a display device according to a preferred embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

FIG. 1 shows a display device 100 according to a preferred embodiment. Only some components of the display device 100 are shown in FIG. 1, other components such as a cover, a backlight module, and optical films are omitted in FIG. 1. The display device 100 comprises a first substrate 1 and a second substrate 2 opposite to the first substrate. A liquid crystal layer 3 is located between the first substrate 1 and the second substrate 2, and a first electrode layer 4 is located on a side of the first substrate 1 adjacent to the liquid crystal layer 3. In an embodiment, the first electrode layer 4 may be located on a side of the first substrate 1 away from the liquid crystal layer 3.

Figure 2:
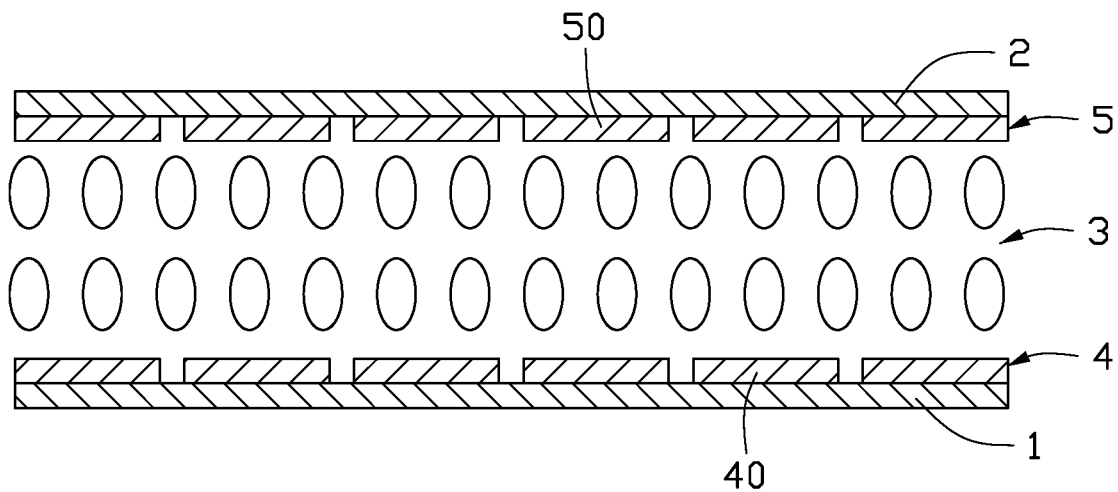
FIG. 2 is a cross-sectional view along line II-II of FIG. 1.
Figure 3:
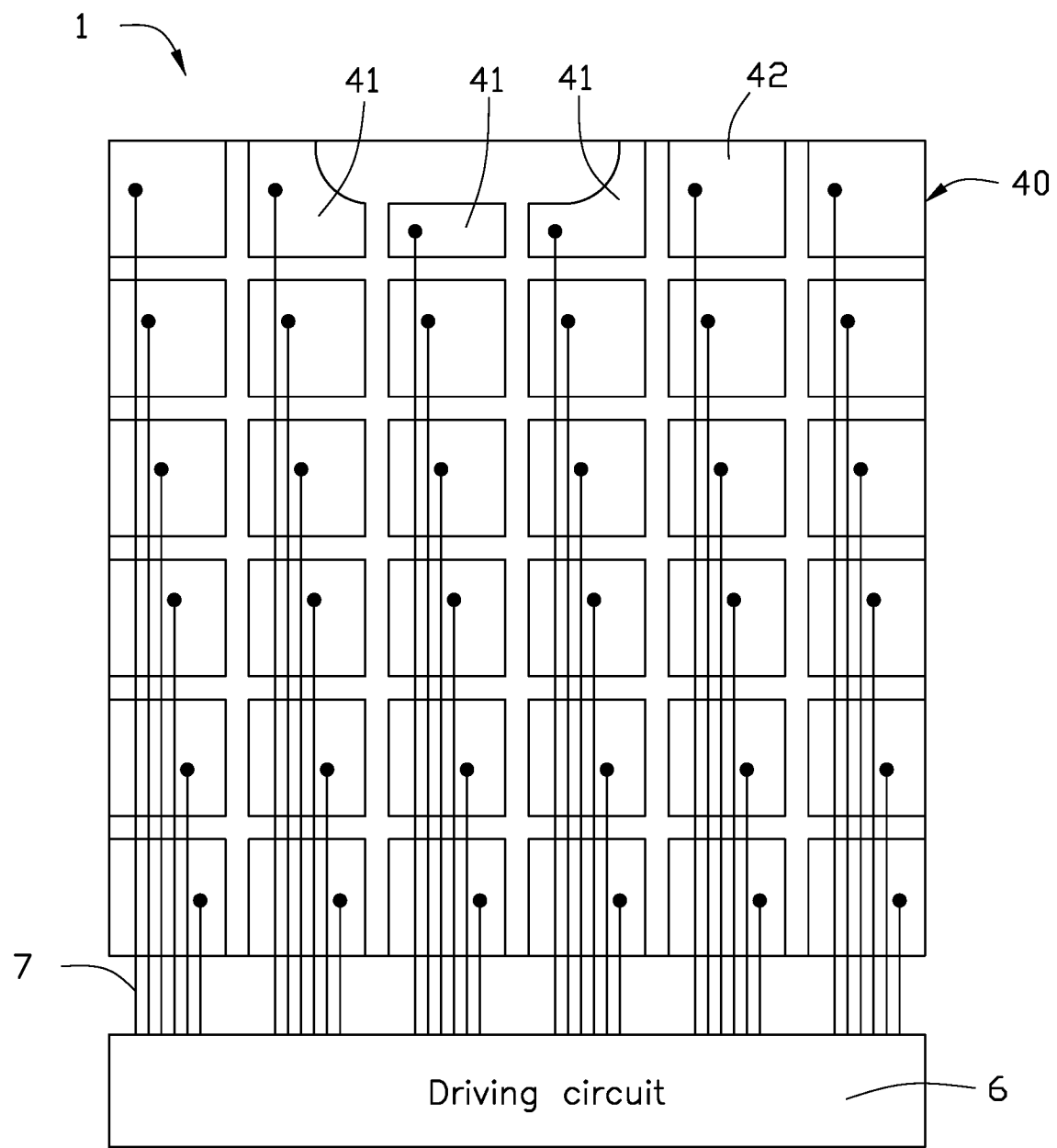
FIG. 3 is a planar view of first electrodes of the display panel according to the preferred embodiment.

As shown in FIG. 1, FIG. 2, and FIG. 3, the first electrode layer 4 comprises a plurality of first electrodes 40 which are independent from each other (space apart from each other). In this embodiment, the first electrodes are arranged in a matrix. The shapes of the first electrodes are not limited, in an embodiment, each of the first electrodes 40 may be a strip electrode or a diamond-shaped electrode. As shown in FIG. 3, the display device further comprises a driving circuit 6, each of the first electrodes is coupled to the driving circuit 6 through a first trace 7.

As shown in FIG. 2, in this embodiment, the first substrate 1 is a TFT (thin film transistor) array substrate, which includes a plurality of TFTs (not shown) and the second substrate 2 is a color filter substrate (also referred to as a counter substrate). The first electrodes 40 are used as common electrodes of the display device 100. The first electrodes 40 receive signals to display images. When the first electrodes 40 function as common electrodes, the driving circuit 6 outputs a voltage (Vcom-1) to each of the first electrodes 40. Then the first electrodes 40 cooperate with pixel electrodes (not shown) of the display device 100 to display images. Specifically, the first electrodes 40 and the pixel electrodes generate an electric field such that liquid crystal molecules (not shown) of the liquid crystal layer 3 are rotated, thereby displaying an image.

As shown in FIG. 3, the first electrodes 40 include at least one first sub-electrode 41 and a plurality of second sub-electrodes 42. Although second sub-electrodes 42 have almost the same area size, an area size of each first sub-electrode 41 is different from an area size of any one of the second sub-electrodes 42. In this embodiment, due to the design of openings on the first sub-electrodes 41, the area size of each first sub-electrode 41 is smaller than the area size of any one of the second sub-electrodes 42. In other embodiment, the area size of each first sub-electrode 41 and of the second sub-electrodes 42 may be different due to other design requirements. In this embodiment, three sub-electrodes 41 are disclosed in the display device 100, area size of each of the three first sub-electrodes 41 is different. In other embodiment, area size of two of the first sub-electrodes 41 are the same. In an embodiment, the area size of each first sub-electrode 41 can be the same.

In this embodiment, the area size of each second sub-electrodes 42 is the same.

In this embodiment, the area sizes of the first sub-electrodes 41 and the second sub-electrodes 42 are different. This prevents the brightness of the display device 100 being uneven when the display device is functioning as a display, due to differences in load between the first sub-electrodes 41 and the second-electrodes 42. The magnitude of Vcom-1 outputted to the first electrodes 40 by the driving circuit 6 can be adjusted according to the differences in the area size of the first sub-electrodes 41 and the second sub-electrodes 42, thereby adjusting the brightness of the display screen.

In this embodiment, the relationship between the area size and a compensation value in Vcom-1 applied to the first electrode 40 can be obtained by a simulation test. In an embodiment, the simulation test may comprise Vcom-1 being able to achieve a specified brightness is defined as a standard voltage value. A voltage value required for the first sub-electrode 41 to reach the specified brightness is compared with the standard voltage value of Vcom-1, and compensation values required for each of the first sub-electrodes 41 to reach the specified brightness are obtained. A relationship between the area size and the compensation value applied to Vcom-1 in the first electrode 40 is thereby obtained.

In this embodiment, Vcom-1 supplied by the driving circuit 6 can include a first common electrode voltage (Vcom-A) and a second common electrode voltage (Vcom-B). The driving circuit 6 outputs Vcom-A to the first sub-electrode 41 and outputs Vcom-B to the second sub-electrode 42, Vcom-A being different from Vcom-B. In this embodiment, the Vcom-B can be a standard voltage, Vcom-A equals to the sum value of the standard voltage plus a compensation voltage. In this embodiment, since the first sub-electrodes 41 each have different sizes, the Vcom-A supplied to each sub-electrode 41 is also different.

In other embodiments, the area sizes of each first sub-electrode 41 may be the same, therefore the Vcom-A to the first sub-electrodes 41 may be one value.

In other embodiments, the difference between Vcom-A and Vcom-B can be achieved by adjusting an internal voltage, by adjusting an internal current, by adjusting an internal resistance, or by adjusting an internal capacitance of the driving circuit 6.

The internal voltage or current or resistance or capacitance of the driving circuit 6 can be increased or decreased according to the area of the first sub-electrode 41.

In this embodiment, the driving circuit 6 includes a plurality of pins (not shown), and the pins correspond respectively to the first electrodes 40. Each first electrode 40 receives its Vcom-1 through a certain pin.

As shown in FIG. 1 and FIG. 2, the display device 100 has a touch sensing function, the display device 100 can be used for displaying images and sensing touch operations. In this embodiment, a second electrode layer 5 is located on a side of the second substrate 2 adjacent to the liquid crystal layer 3. The second electrode layer 5 includes independent (spaced) second electrodes 50. The second electrodes 50 are arranged in a matrix, and each of the second electrodes 50 is coupled to the driving circuit 6 through a second trace (not shown).

In other embodiments, the second electrode layer 5 may be located on a side of the second substrate 2 away from the liquid crystal layer 3.

In this embodiment, the first electrodes 40 are also used as touch sensing electrodes, and the second electrodes 50 are also used as touch driving electrodes. The second electrodes 50 are loaded with touch driving voltages, and the first electrodes 40 output voltages when sensing touches. When a finger or an electrical conductor contacts the screen of the display device 100, the capacitance between the first electrode 40 and the second electrode 50 is changed, and the display device 100 can calculate the touch position of the finger or the electrical conductor according to the change in capacitance.

However, in other embodiment, the first electrodes 40 may be used as common electrodes and touch driving electrodes of the display device 100, and the second electrodes 50 function as touch sensing electrodes.

In another embodiment, a portion of the first electrodes 40 are used as common electrodes and touch driving electrodes of the display device 100, another portion of the first electrodes 40 are used as touch sensing electrodes, and no second electrodes 50 are required.

In an embodiment, the first electrodes 40 are used as common electrodes and touch driving electrodes. Each frame of the display device 100 includes a display period and a touch period. The driving circuit 6 controls the first electrode 40 to be in the display period or in a touch period by a time-sharing arrangement. In the display period, the driving circuit 6 outputs the Vcom-A to the first sub-electrode 41, and outputs the Vcom-B to the second sub-electrodes 42. In the touch period, the driving circuit 6 outputs touch driving voltages to the first electrodes 41.

It can be understood that, during the touch period, since the areas of the first sub-electrodes 41 and the second sub-electrodes 42 are different, the touch sensitivity of the display device 100 may be uneven and not uniform due to the difference in load between the first sub-electrode 41 and the second-electrode 42. To prevent this, the magnitude of the touch driving voltage outputted to the first electrodes 40 by the driving circuit 6 can be adjusted according to the difference in the areas of the first sub-electrodes 41 and the second sub-electrodes 42.

When the first electrodes 40 are used as touch driving electrodes, the touch driving voltage outputted by the driving circuit 6 includes more than one voltage value. In this embodiment, there are at least one first touch driving voltage (TD-1) and a second touch driving voltage (TD-2). The driving circuit 6 outputs TD-1 to the first sub-electrode 41, and outputs TD-2 to the second sub-electrode 42. TD-1 and TD-2 have different voltage values.

In this embodiment, the touch driving voltage is a square wave signal. By adjusting the driving circuit 6, the amplitudes of TD-1 and TD-2 may be different, or the frequencies of TD-1 and TD-2 may be different.

The first electrodes 40 and the second electrodes 50 may be made of any one or more of metal, indium tin oxide (ITO), zinc oxide (ZnO), Poly(3, 4-ethylenedioxythiophene) (PEDOT), carbon nanotube (CNT), Ag nano wire (ANW), or graphene, not being limited thereto.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A display device, comprising:
   a first substrate;
   a plurality of common electrodes located on a surface of the first substrate and configured for receiving common signals to display images;
   wherein the common electrodes comprise at least one first sub-electrode and a plurality of second sub-electrodes each having substantially a same area size, an area of each of the first sub-electrodes is smaller than an area of each of the second sub-electrodes;
   when the display device performs display, the first sub-electrode is applied with a first common electrode voltage, and each of the second sub-electrodes is applied with a second common electrode voltage; wherein the first common electrode voltage is different from the second common electrode voltage;
   wherein the display device further comprises a driving circuit electrically connected to each of the common electrodes, the driving circuit outputs the first common electrode voltage to the at least one first sub-electrode, and the second common electrode voltage to each of the second sub-electrodes;

wherein the first common electrode voltage comprises a compensation voltage which is obtained based on a difference value between the area of the first sub-electrode and the area of any one of the second sub-electrodes.

2. The display device of claim 1, wherein the second common electrode voltage is a standard voltage, and the first common electrode voltage equals to a sum value of the standard voltage and the compensation voltage.

3. The display device of claim 1, wherein a number of the at least one of the first sub-electrode is more than one, and areas of the first sub-electrodes are different from each other.

4. The display device of claim 1, wherein an amplitude of the first common electrode voltage is different from amplitudes of the second common electrode voltages.

5. The display device of claim 1, wherein a frequency of the first common electrode voltage is different from a frequency of each of the second common electrode voltage.

6. The display device of claim 1, wherein the display device is a touch display device, each frame of the display device includes a touch period and a display period, the common electrodes are also used as touch driving electrodes to receive touch driving voltages in the touch period; and
in the touch period, the driving circuit outputs a first touch driving voltage to the at least one first sub-electrode and a second touch driving voltage to each of the second sub-electrodes;
wherein the first touch driving voltage is different from the second touch driving voltage.

7. The display device of claim 6, wherein an amplitude of the first touch driving voltage is different from an amplitude of the second touch driving voltage.

8. The display device of claim 6, wherein a frequency of the first touch driving voltage is different from a frequency of the second touch driving voltage.

9. The display device of claim 1, wherein the display device is a touch display device, each frame of the display device includes a touch period and a display period, the common electrodes are also used as touch sensing electrodes to receive touch sensing voltages in the touch period; and
in the touch period, the plurality of common electrodes output touch sensing voltages.

10. A display device, comprising:
a first substrate;
a plurality of common electrodes located on a surface of the first substrate and configured for receiving common signals to display images;
wherein the common electrodes comprise at least one first sub-electrode and a plurality of second sub-electrodes each having substantially a same area size, an area of each of the first sub-electrodes is smaller than an area of each of the second sub-electrodes;
when the display device performs display, the first sub-electrode is applied with a first common electrode voltage, and each of the second sub-electrodes is applied with a second common electrode voltage; wherein the first common electrode voltage is different from the second common electrode voltage;
wherein the first common electrode voltage comprises a compensation voltage which is obtained based on a difference value between the area of the first sub-electrode and the area of any one of the second sub-electrodes.

11. The display device of claim 10, wherein the display device further comprises a driving circuit electrically connected to each of the common electrodes, wherein the driving circuit outputs the first common electrode voltage to the at least one first sub-electrode, and the second common electrode voltage to each of the second sub-electrodes.

12. The display device of claim 11, wherein the second common electrode voltage is a standard voltage, and the first common electrode voltage equals to a sum value of the standard voltage and the compensation voltage.

13. The display device of claim 10, wherein a number of the at least one of the first sub-electrode is more than one, and areas of the first sub-electrodes are different from each other.

14. The display device of claim 10, wherein an amplitude of the first common electrode voltage is different from amplitudes of the second common electrode voltages.

15. The display device of claim 10, wherein a frequency of the first common electrode voltage is different from a frequency of each of the second common electrode voltage.

16. The display device of claim 11, wherein the display device is a touch display device, each frame of the display device includes a touch period and a display period, the common electrodes are also used as touch driving electrodes to receive touch driving voltages in the touch period; and
in the touch period, the driving circuit outputs a first touch driving voltage to the at least one first sub-electrode and a second touch driving voltage to each of the second sub-electrodes;
wherein the first touch driving voltage is different from the second touch driving voltage.

17. The display device of claim 16, wherein an amplitude of the first touch driving voltage is different from an amplitude of the second touch driving voltage.

18. The display device of claim 16, wherein a frequency of the first touch driving voltage is different from a frequency of the second touch driving voltage.

19. The display device of claim 11, wherein the display device is a touch display device, each frame of the display device includes a touch period and a display period, the common electrodes are also used as touch sensing electrodes to receive touch sensing voltages in the touch period; and
in the touch period, the plurality of common electrodes output touch sensing voltages.

* * * * *